US008917600B2

(12) United States Patent
Avila Gonzalez et al.

(10) Patent No.: US 8,917,600 B2
(45) Date of Patent: Dec. 23, 2014

(54) TECHNIQUE FOR INTRODUCING A REAL-TIME CONGESTION STATUS IN A POLICY DECISION FOR A CELLULAR NETWORK

(75) Inventors: Victor Manuel Avila Gonzalez, Madrid (ES); Roberto David Carnero Ros, Madrid (ES); Zsolt Kenesi, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 112 days.

(21) Appl. No.: 13/704,038

(22) PCT Filed: Jun. 25, 2010

(86) PCT No.: PCT/EP2010/003905

§ 371 (c)(1), (2), (4) Date: Jan. 24, 2013

(87) PCT Pub. No.: WO2011/160660

PCT Pub. Date: Dec. 29, 2011

(65) Prior Publication Data

US 2013/0272197 A1 Oct. 17, 2013

(51) Int. Cl.

| | |
|---|---|
| ***H04L 1/00*** | (2006.01) |
| ***H04W 24/02*** | (2009.01) |
| ***H04L 12/26*** | (2006.01) |
| ***H04W 28/02*** | (2009.01) |
| *H04W 24/08* | (2009.01) |

(52) U.S. Cl.

CPC ............... *H04W 24/02* (2013.01); *H04L 12/26* (2013.01); *H04W 28/02* (2013.01); *H04W 24/08* (2013.01)

USPC .......................................... 370/235; 370/328

(58) Field of Classification Search

CPC ............................... H04L 12/26; H04W 24/02

USPC ................................................... 370/235, 328

See application file for complete search history.

(56) References Cited

U.S. PATENT DOCUMENTS

| | | | | |
|---|---|---|---|---|
| 2005/0041584 | A1 * | 2/2005 | Lau et al. | 370/235 |
| 2010/0290392 | A1 * | 11/2010 | Rasanen et al. | 370/328 |
| 2012/0059944 | A1 * | 3/2012 | Fernandez Alonso et al. | 709/228 |

FOREIGN PATENT DOCUMENTS

| | | | |
|---|---|---|---|
| EP | 1282324 | A1 | 2/2003 |
| EP | 2200362 | A1 | 6/2010 |
| WO | 2005002149 | A1 | 1/2005 |

OTHER PUBLICATIONS

3GPP, "Technical Specification Group Services and System Aspects; Policy and Charging Control Architecture"; (3GPP TS 23.203 version 9.4.0 Release 9; Mar. 1, 2010; pp. 1-123; Technical Specification, European Telecommunications Standards Institute (ETSI), 650 Route des Lucioles; F-06921, Sophia-Antipolis; France.

(Continued)

*Primary Examiner* — Sai-Ming Chan

(74) *Attorney, Agent, or Firm* — Coats & Bennett, PLLC

(57) ABSTRACT

A technique for introducing a real-time congestion status in a Policy and Charging Rules Function (PCRF) policy decision in a cellular network is presented. A method embodiment performed by the PCRF comprises the steps of obtaining, from one of a Policy Charging Enforcement Function (PCEF) and a database, at least one cell identifier; sending, to a Performance Manager network element, a request for checking congestion status, the request comprising the at least one cell identifier; receiving, from the Performance Manager network element, a retrieved congestion status for the at least one cell identifier; generating at least one of a QoS Class Identifier and a QoS Profile based on the at least one cell identifier and the received congestion status; and sending, to the PCEF, a message comprising the at least one of the Class Identifier and QoS Profile.

10 Claims, 6 Drawing Sheets

(56) References Cited

OTHER PUBLICATIONS

3GPP, "Digital Cellular Telecommunications System (Phase 2+); Universal Mobile Telecommunications System (UMTS); LTE; Policy and Charging Control Architecture"; (3GPP ETSI TS 123 203 version 9.4.0 Release 9; Mar. 2010; pp. 1-126; Technical Specification, European Telecommunications Standards Institute (ETSI), 650 Route des Lucioles; F-06921, Sophia-Antipolis; France.

* cited by examiner

100

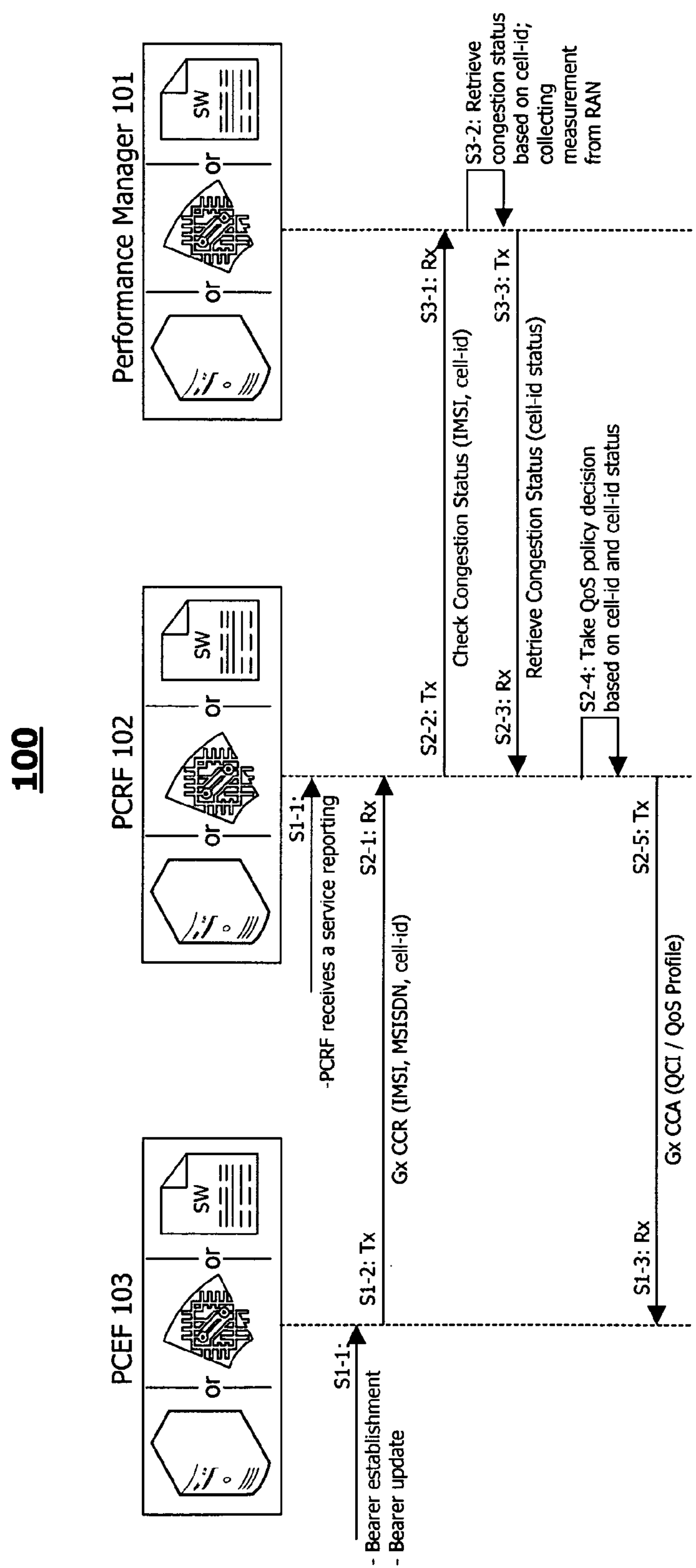
Fig. 2
100
PCEF 103
PCRF 102
Performance Manager 101
or
SW
- Bearer establishment
- Bearer update
S1-1:
S1-2: Tx
Gx CCR (IMSI, MSISDN, cell-id)
S2-1: Rx
S1-1:
-PCRF receives a service reporting
S2-2: Tx
Check Congestion Status (IMSI, cell-id)
S3-1: Rx
S3-2: Retrieve congestion status based on cell-id; collecting measurement from RAN
S3-3: Tx
Retrieve Congestion Status (cell-id status)
S2-3: Rx
S2-4: Take QoS policy decision based on cell-id and cell-id status
S2-5: Tx
Gx CCA (QCI / QoS Profile)
S1-3: Rx

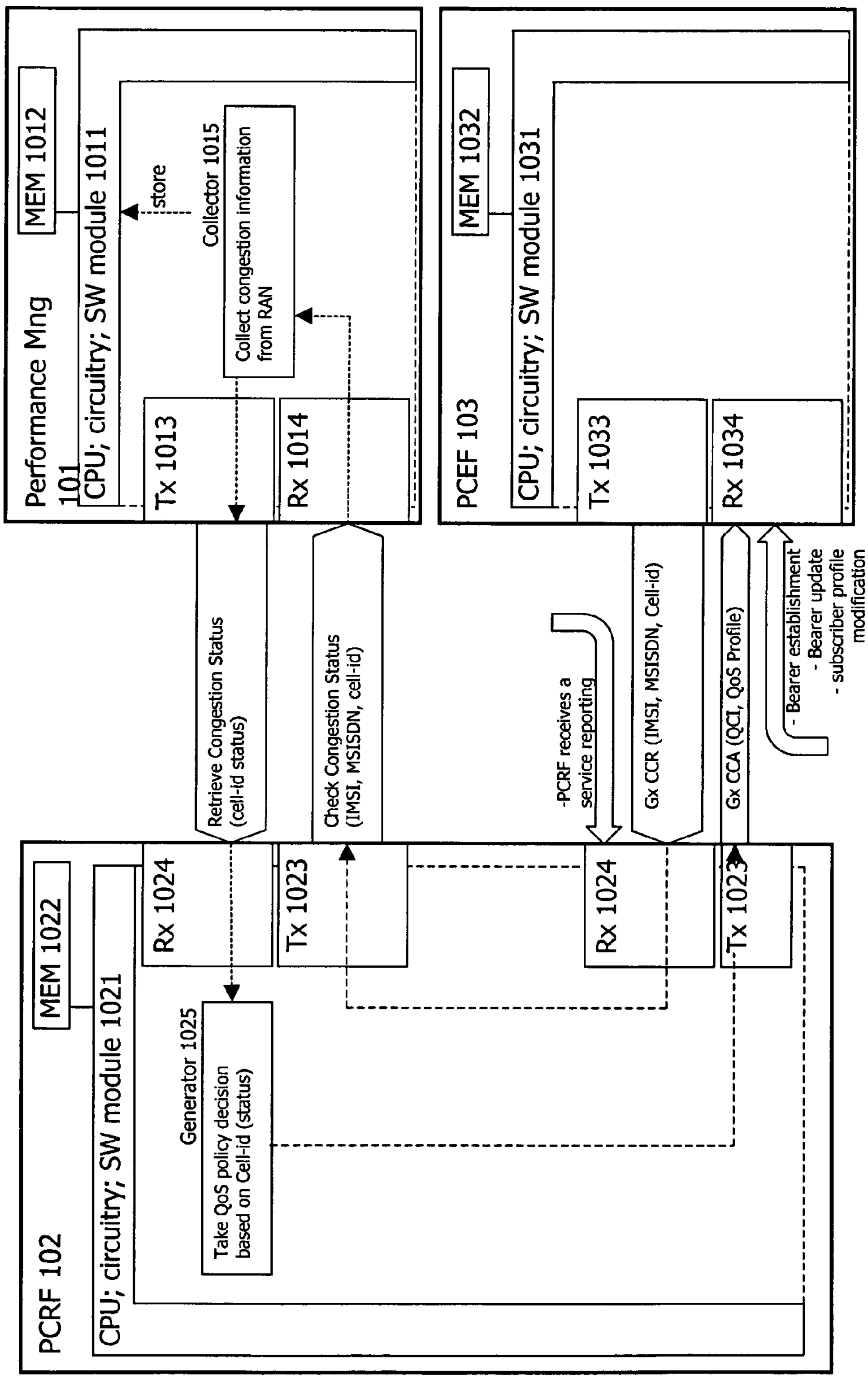
Fig. 3
Performance Mng 101
MEM 1012
CPU; circuitry; SW module 1011
store
Collector 1015
Collect congestion information from RAN
Tx 1013
Rx 1014
PCEF 103
MEM 1032
CPU; circuitry; SW module 1031
Tx 1033
Rx 1034
Retrieve Congestion Status (cell-id status)
Check Congestion Status (IMSI, MSISDN, cell-id)
-PCRF receives a service reporting
Gx CCR (IMSI, MSISDN, Cell-id)
Gx CCA (QCI, QoS Profile)
- Bearer establishment
- Bearer update
- subscriber profile modification
PCRF 102
MEM 1022
CPU; circuitry; SW module 1021
Rx 1024
Tx 1023
Rx 1024
Tx 1023
Generator 1025
Take QoS policy decision based on Cell-id (status)

100

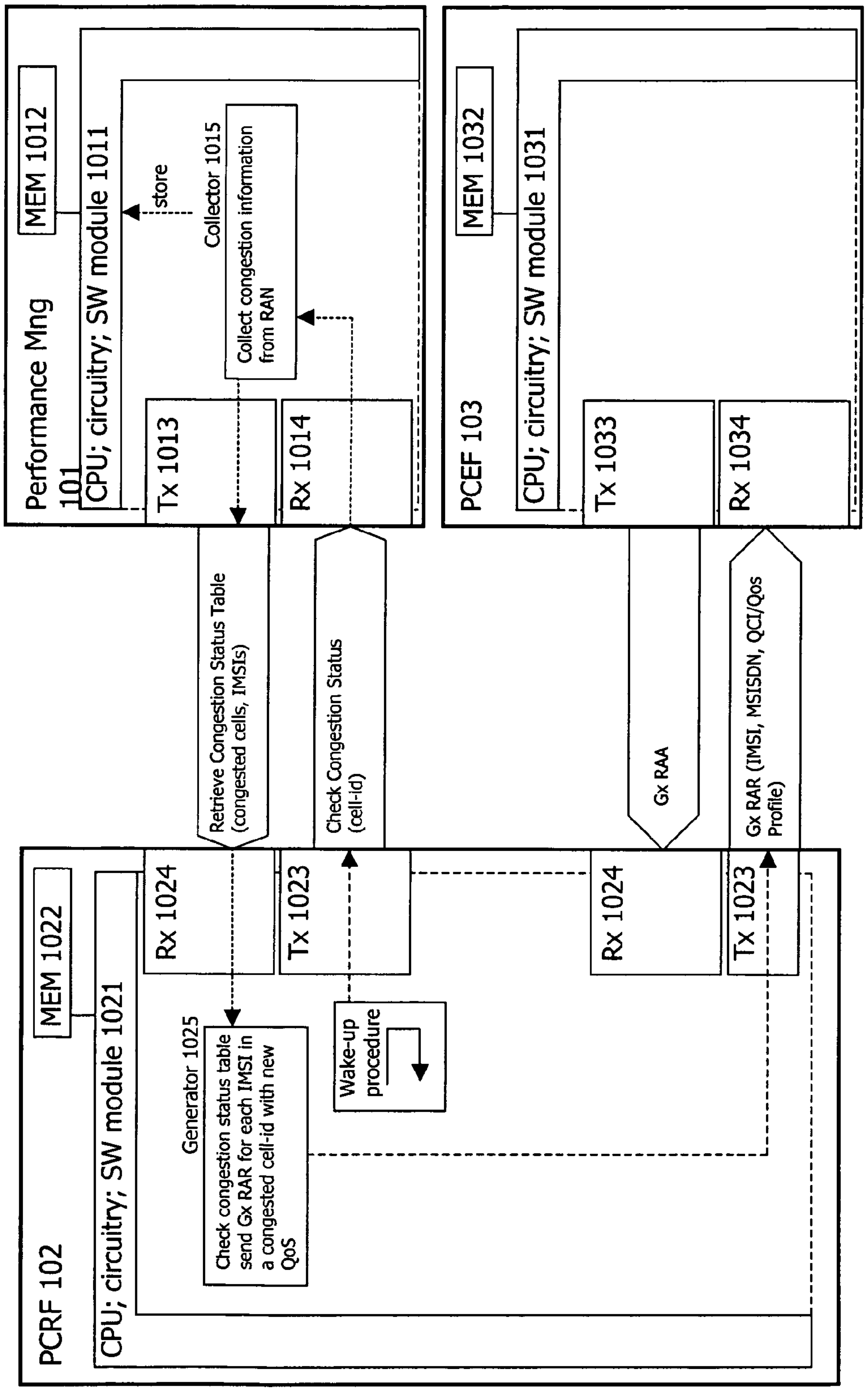
Fig. 5
Performance Mng 101
MEM 1012
CPU; circuitry; SW module 1011
store
Collector 1015
Collect congestion information from RAN
Tx 1013
Rx 1014
PCEF 103
MEM 1032
CPU; circuitry; SW module 1031
Tx 1033
Rx 1034
Retrieve Congestion Status Table (congested cells, IMSIs)
Check Congestion Status (cell-id)
Gx RAA
Gx RAR (IMSI, MSISDN, QCI/Qos Profile)
PCRF 102
MEM 1022
CPU; circuitry; SW module 1021
Rx 1024
Tx 1023
Generator 1025
Check congestion status table send Gx RAR for each IMSI in a congested cell-id with new QoS
Wake-up procedure
Rx 1024
Tx 1023

TECHNIQUE FOR INTRODUCING A REAL-TIME CONGESTION STATUS IN A POLICY DECISION FOR A CELLULAR NETWORK

TECHNICAL FIELD

The present invention generally relates to the handling of network congestion situations. In particular, a technique for introducing a real-time congestion status in a policy decision for a cellular network is described.

BACKGROUND

3rd Generation Partnership Project, Release 99 (3GPP R99) defines an end-to-end congestion control mechanism based on 3GPP Quality of Service (QoS) profile handling. The 3GPP QoS profile typically comprise two parameters, the Traffic class and the Traffic Handling Priority (THP), which are used by a Radio Access Network (RAN) Scheduler in order to set traffic priority in a congestion situation. There are four possible values for Traffic Class (called Conversational, Streaming, Interactive and Background), and three values for the THP (only applicable to Traffic Class Interactive).

Policy and Charging Control (PCC) in the Internet Protocol Multimedia Subsystem (IMS) and similar service network architectures involves network elements such as a Charging Rules Function (PCRF) and a Policy Charging Enforcement Function (PCEF). The PCRF provides a set of traffic filters for policy control and flow based charging, and communicates with Application Functions (AFs) to determine authorized resources for session-based services. The PCEF, on the other hand, provides service data flow detection, policy enforcement and flow based charging functionalities.

In the PCC framework (e.g., according to 3GPP Release 7), the PCRF has the capability of providing one specific QoS profile at bearer establishment/update, which is enforced backwards towards the RAN. If congestion happens, the RAN may take into account the Traffic Class and/or THP value in order to decide which bearers are assigned a higher priority and, consequently, more bandwidth resources.

Further, 3GPP Release 8 has defined another QoS control mechanism, which is based on admission control and resource reservation principles: provide different congestion treatment for different kinds of subscribers, and guarantee a specific QoS for specific services even in the case of congestion (and therefore not allowing in a congestion case the establishment of services requiring a high QoS). For this purpose, the QoS control mechanism defined in 3GPP Release 8 distinguishes two different kinds of bearers: Guaranteed Bit Rate (GBR) and non-GBR. Besides, 3GPP Release 8 has introduced another way of handling priority: the QoS Class Identifier (QCI). The QCI is a number, preconfigured by the operator, which number implies a certain meaning regarding parameters for packet forwarding treatment. Each service can have one or more related QCIs. In addition, every QCI (GBR and non-GBR) is associated with a priority level. The QCI mechanism enables a service-specific congestion control, providing different values for different services running on the same bearer. The PCRF can provide a specific QCI value for example at bearer establishment/modification.

Congestion control mechanisms based on QoS profile (Traffic Class and THP) and QCI are applied in a 'pre-configured' way. That is, the mechanisms are assigned at bearer activation/update, and are applied only in case congestion happens. The mechanisms work on a scheduling basis, assigning resources to the most prioritized bearers/services, but do not depend on the actual cell congestion, and can therefore not react to the congestion situation dynamically, for example, to enable the removal of the congestion situation as quickly as possible. In fact, the above mechanisms may even permit a permanent congestion situation.

Regarding the 3GPP QoS profile congestion control mechanism, this mechanism applies to the bearer as a whole. Therefore, the network is not capable of a service-specific control (e.g., is not able to apply a throughput limitation just to one specific service of all the services running on a specific bearer). Besides, 3GPP Release 8 requires the initial bearer activation support on side of the network, which implies requirements in the terminals (for example, legacy terminals are not supported).

SUMMARY

The present invention aims at addressing at least dynamical reaction to the congestion situation and/or preventing a permanent congestion situation, and at addressing further problems.

In a first aspect, a method for introducing a real-time congestion status in a PCRF policy decision in a cellular network is provided, wherein the method is performed in the PCRF and comprises the steps of: obtaining, from a PCEF or a database, at least one cell identifier; sending, to a Performance Manager network element, a request for checking congestion status, the request comprising the at least one cell identifier; receiving, from the Performance Manager network element, a retrieved congestion status for the at least one cell identifier; generating a QCI and/or QoS profile based on the at least one cell identifier and the received congestion status; and sending, to the PCEF, a message comprising the QCI and/or QoS profile.

The cell identifier may be obtained in the context of a subscriber session (e.g., an Internet Protocol, IP, session). As such, the PCRF may, from the PCEF, receive an identifier of a particular subscriber or of a particular subscriber session together with the cell identifier. The cell identifier may identify the cell in which the subscriber is holding the particular session. In a 3GPP Release 8 scenario, the session could be a IP-CAN Session.

In a second aspect, a method for introducing a real-time congestion status in a PCRF policy decision in a cellular network is provided, wherein the method is performed in a Performance Manager network element and comprises the steps of: receiving, from the PCRF, a request for checking congestion status, the request comprising at least one cell identifier; retrieving the congestion status based on the at least one cell identifier; and sending, to the PCRF, the retrieved congestion status for the at least one cell identifier. The cell identifier may be received per subscriber session (and may thus be received together with a subscriber identifier and/or a session identifier).

The Performance Manager network element can be implemented, for example, in a stand-alone server, can be co-located with the PCRF or with an Operation Support System (OSS), can be a subassembly, circuitry or any other means to be implemented in another suitable network element (e.g., in the PCRF or the OSS), or can be a software module running on an own network element or on another suitable network element (e.g., on the PCRF or on the OSS).

According to the first and second aspects, congestion status updates (on a per cell basis) are introduced in particular for real-time QoS control decisions. For such purpose, the Performance Manager element may collect cell congestion information from the RAN, and may optionally store the information in the database. The PCRF may access the database (e.g., via the Sp reference point implementation), thus being able of congestion status analysis (on a per-cell basis) for QoS control decisions. Therefore, the PCRF may enforce a congestion-based QoS profile/QCI into the PCEF. The PCRF may access the database for example upon bearer establishment or bearer update (modification). In the scenario of 3GPP Release 8, database access by the PCRF may, for example, be performed in the context of IP-CAN Session establishment (i.e., default bearer establishment) or IP-CAN Session modification (which may imply establishment of a new bearer).

The Performance Manager network element may be connected to the PCRF. By means of analyzing measurements provided by the RAN, the Performance Manager element is capable of detecting congestion in the network. Besides, the Performance Manager network element can identify the user terminals affected by the congestion. The Performance Manager element may update the congestion information on a configurable time basis. In one implementation, the Performance Manager element stores this information in a database.

According to the second aspect, the retrieving step may further comprise collecting, from the cellular network, analysis measurements on the congestion status. This development may allow for a quick adaptation of the QCI/QoS profile to the current needs imposed by the cellular network load.

As for a development of the first and second aspects, the at least one cell identifier may be obtained from the PCEF upon at least one of network bearer establishment, network bearer update, subscriber profile modification, and the PCRF receiving a service reporting. In this case, the at least one cell identifier may be obtained via a Credit Control Request (CCR). In addition, the request for checking congestion may further comprise an International Mobile Subscriber Identity (IMSI) or another identifier pertaining to the subscriber or his/her user terminal, and/or a session identifier.

Further, the cell identifier may be stored, for example, in the PCRF session data, and may be used in order to request the congestion status for such cell from the Performance Manager element database (e.g., via the Sp reference point). That is, for example at bearer establishment or update (modification), the PCEF may send a Gx CCR message to the PCRF reporting bearer establishment or update. The PCRF may provide, in the respective Gx CCA, new policies regarding QoS or service authorization. The cell identifier may be among the data that the PCEF sends to the PCRF in the Gx CCR.

The QCI and/or QoS profile may be generated based on a QoS policy decision (sometimes also referred to as policy control decision). The policy decision may take into account one or more of the following items of information: Cell identifier, subscriber identifier and session identifier (e.g., if cell-id==325 && congestion-status==congested THEN QCI==9). Further, the message comprising the QCI and/or QoS profile may be a Credit Control Answer (CCA).

As another development of the first and second aspects, at least one cell identifier may be obtained from the database. The cell identifier may, for example, be obtained upon a wake-up procedure of the PCRF and/or upon repeatedly performed look-ups from the PCRF at the Performance Manager network element. As an example, the PCRF may periodically perform configurable look-ups into the Performance Manager database in order to obtain congestion status updates. The purpose of these look-ups may be to check if there has been any change in the congestion situation (e.g., during the last minutes). In case the congestion status has changed, the PCRF can provide a new QoS profile/QCI (updated with the actual congestion status) to be enforced into the PCEF.

In this development, the retrieved congestion status may comprise a congestion status table, the congestion status table comprising information pertaining to at least one congested cell, at least one congestion status of the at least one congested cell, and at least one subscriber identifier (e.g., an IMSI) related to a subscriber that is located in at least one congested cell. Based on the information from the congestion status table, the PCRF may request (e.g., on a per subscriber basis) an unsolicited session modification towards the PCEF in order to install new policies regarding QoS and service authorization. By this mechanism, the PCRF can provide new bandwidth limits that could imply the removal of the congestion situation (3GPP mechanism just provides prioritization means). In turn, the QCI and/or QoS profile may be generated based on checking the congestion status table, and the message comprising the QCI and/or QoS profile may be sent for each IMSI of the congested cell identified by the cell identifier. In the latter case, the message comprising the QCI and/or QoS profile may be a Re-Authorization Request (RAR) further comprising one of the subscriber identifiers (e.g., one of the IMSIs).

According to a third aspect, a computer program product is provided, comprising program code portions for performing the method presented herein when the computer program product is executed on one or more computing devices. The computer program product may be stored on a computer readable recording medium.

With respect to a fourth aspect, a network element implementing a PCRF for introducing a real-time congestion status in a PCRF policy decision in a cellular network is provided, the network element comprising: a component adapted to obtain, from a PCEF and/or a database, at least one cell identifier; a component adapted to send, to a Performance Manager network element, a request for checking congestion status, the request comprising the at least one cell identifier; a component adapted to receive, from the Performance Manager network element, a retrieved congestion status for the at least one cell identifier; a component adapted to generate QCI and/or QoS profile based on the at least one cell identifier and the received congestion status; and a component adapted to send, to the PCEF, a message comprising the QCI and/or QoS profile.

Concerning a fifth aspect, a network element implementing a Performance Manager network element for introducing a real-time congestion status in a PCRF policy decision in a cellular network is provided, the network element comprising: a component adapted to receive, from the PCRF, a request for checking congestion status, the request comprising at least one cell identifier; a component adapted to retrieve the congestion status based on the at least one cell identifier; and a component adapted to send, to the PCRF, the retrieved congestion status for the at least one cell identifier. In one variant, the retrieving component may further comprise a component adapted to collect, from the cellular network, analysis measurements on the congestion status.

As for a sixth aspect, a data structure for introducing a real-time congestion status in a PCRF policy decision in a cellular network is provided, wherein the data structure comprises a field adapted to store at least one cell identifier identifying at least one congested cell; a field adapted to store a congestion status of the at least one congested cell; and a field adapted to store at least one IMSI or similar identifier related to the at least one congested cell. The data structure may take the form of a Congestion status table.

BRIEF DESCRIPTION OF THE DRAWINGS

Various embodiments of the present invention will be described herein below with reference to the accompanying drawings, in which:

FIG. 2 shows a signaling diagram illustrating the introduction of a real-time congestion status in a policy decision in a cellular network according to a first embodiment of the present invention;

FIG. 3 shows apparatuses for introducing a real-time congestion status in a policy decision in a cellular network according to the first embodiment of the present invention;

FIG. 5 shows apparatuses for introducing a real-time congestion status in a policy decision in a cellular network according to the second embodiment of the present invention.

DETAILED DESCRIPTION

In the following description of preferred embodiments, for purposes of explanation and not limitation, specific details are set forth (such as particular communication standards and message formats) in order to provide a thorough understanding of the technique presented herein. It will be apparent to one skilled in the art that the present technique may be practiced in other embodiments that depart from these specific details. For example, while the embodiments will primarily be described in the context of the 3GPP PCC, it will be evident that the technique presented herein can also be practiced in connection with other communication standards and access networks.

Moreover, those skilled in the art will appreciate that the services, functions and steps explained herein below may be implemented using software functioning in conjunction with a programmed microprocessor, or using an Application Specific Integrated Circuit (ASIC), a Digital Signal Processor (DSP) or general purpose computer. It will also be appreciated that when the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 1:
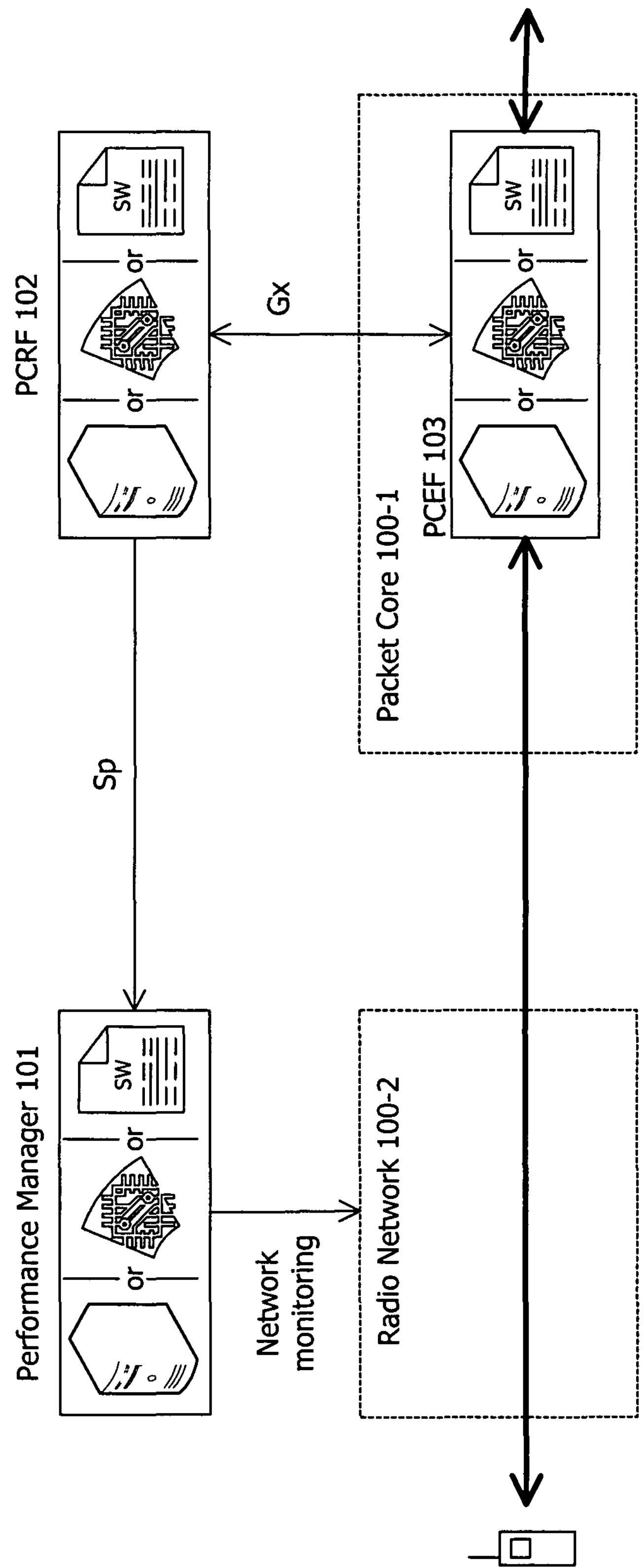
FIG. 1 illustrates a basic principle for introducing a real-time congestion status in a policy decision in a cellular network.

FIG. 1 illustrates the basic principle for introducing a real-time congestion status in a policy decision in a cellular network 100 according to embodiments that will be described in more detail below. As shown in FIG. 1, the cellular network 100 comprises a Performance Manager (network element) 101, a PCRF 102, a PCEF 103 and a user terminal, such as a mobile telephone, notebook with network access etc. The Performance Manager 101 may be an Operation & Maintenance Component (e.g., a part of an OSS), the PCRF 102 may be connected towards an IP Multimedia Subsystem (IMS), and the PCEF 103 may be realized in an Evolved Packet Core (EPC) node such as GGSN. The PCEF 103 is comprised in a packet core 100-1, and communicates with the user terminal via a radio or other network 100-2. The Performance Manager 101 and the PCRF 102 communicate with each other via the Sp interface, while the PCRF 102 and the PCEF 103 communicate with each other via the Gx interface.

FIGS. 2 and 3 illustrate an approach for introducing a real-time congestion status in a policy decision in the cellular network as shown in FIG. 1 according to a first embodiment. In the signaling diagram of FIG. 2, signaling between elements is indicated in horizontal direction, while time aspects between signaling are reflected in the vertical arrangement of the signaling sequence as well as in the sequence numbers. It is to be noted that the time aspects indicated in FIG. 2 do not necessarily restrict any one of the method steps to the step sequence outlined in FIG. 2. This applies in particular to method steps that are functionally disjunctive with each other.

FIG. 3 shows apparatuses (Performance Manager 101, PCRF 102 and PCEF 103) for introducing a real-time congestion status in a policy decision in a cellular network according to the first embodiment. As shown in FIG. 3, the Performance Manager 101 comprises a core functionality (e.g., a central processing unit (CPU), a dedicated circuitry or a software module) 1011, a memory (and/or database) 1012, a transmitter 1013, a receiver 1014 and a collector 1015. The PCRF 102 comprises a core functionality (e.g. a CPU, a dedicated circuitry or a software module) 1021, a memory (and/or database) 1022, a transmitter 1023, a receiver 1024 and a generator 1025. Finally, the PCEF 103 comprises a core functionality (e.g. CPU, a dedicated circuitry or a software module) 1031, a memory (and/or database) 1032, a transmitter 1033 and a receiver 1034.

As indicated by the dashed extensions of the functional blocks of the CPUs 1011, 1021 or 1031, the collector 1015 and the generator 1025 (and the components for transmitting 1013, 1023 or 1033 and the components for receiving 1014, 1024 or 1034) may be functionalities running on the CPUs 1011, 1021 or 1031, or may alternatively be separate functional entities or means being controlled by the CPUs 1011, 1021 or 1031 and supplying the same with information.

The CPUs **10*x*1 (wherein x=1, 2 or 3) may respectively be configured, for example by software residing in the memory 10*x*2, to process various data inputs and to control the functions of the memories 10*x*2, the transmitter 10*x*3 and the receiver 10*x*4 (as well as the collector 1015, if x=1, and the generator 1025, if x=2). The memories 10*x*2 may serve for storing code means for carrying out the steps presented herein when run on the CPUs 10*x*1**.

It is to be noted that the transmitter **10*x*3 and the receiver 10*x*4 may alternatively be provided as respective integral transceivers. It is further to be noted that the transmitters/receivers may be implemented as physical transmitters/receivers for transceiving e.g. via the air interface (e.g., between the terminal and the PCEF 103), as routing entities for transmitting/receiving data packets, for example, in a Packet Switching (IPS)) network (e.g., between PCRF 102 and PCEF 103 when disposed as separate network entities), as functionalities for writing/reading information into/from a given memory area (e.g. in case of shared/common CPUs or memories of the PCRF 102 and PCEF 103** when disposed as an integral network entity), as interfaces between network elements, or as any suitable combination of the above.

Referring now to the signaling diagram of FIG. 2, in preparatory step S1-1, the receiver 1034 of the PCEF 103 or the receiver 1024 of the PCRF 102 receives a network bearer establishment or a network bearer update (modification) and/or, in case of the PCRF, a service reporting or a subscriber profile modification Upon network bearer establishment or a network bearer update, in step S1-2, the transmitter 1033 of the PCEF 103 transmits a Credit Control Request (CCR) comprising the at least one cell identifier. The CCR may further comprise an IMSI and, optionally, a Mobile Subscriber Integrated Services Digital Network Number (MSISDN). In turn, in step S2-1, the receiver 1024 of the PCRF 102 may receive/obtain the at least one cell identifier. In the fourth case (PCEF receiving a service reporting), the at least one cell identifier may also be obtained/fetched from the memory/database 1022 of the PCRF 102.

Then, in step S2-2, the transmitter 1023 of the PCRF 102 transmits/sends a request for checking congestion status to the Performance Manager 101, the request comprising the at least one cell identifier. In turn, in step S3-1, the receiver 1014 of the Performance Manager 101 receives the request for checking the congestion status, comprising the at least one cell identifier.

In step S3-2, the CPU 1011 of the Performance Manager 101 retrieves the congestion status based on the at least one cell identifier. In this case, the CPU 1011 may be augmented by the collector 1015 which collects analysis measurements on the congestion status from the cellular network 100, for example. The Performance Manager 101 can deduct a congestion situation based on two pieces of information that are available through OSS: the average throughput of a specific cell, and the average number of users of a specific cell.

Then, in step S3-3, the transmitter 1014 of the Performance Manager 101 transmits/sends the retrieved congestion status corresponding to the at least one cell identifier. In turn, in step S2-3, the receiver 1024 of the PCRF 102 receives the retrieved congestion status (for the at least one cell identifier).

In step S2-4, the generator 1025 of the PCRF 102 generates a QCI and/or a QoS profile based on the at least one cell identifier and the received congestion status. In other words, the generator 1025 may take a QoS policy control decision based on the cell ID and the cell ID status. If, for example, the cell with the identifier 221 is congested, the QoS profile to be provided for an associated IP-CAN Session could be the one identified by QoSProfile1 (i.e., if cell-id==221 & congestion-status==congested THEN QoSProfile1).

Finally, in step S2-5, the transmitter 1023 of the PCRF 102 transmits/sends a message comprising the QCI and/or QoS profile to the PCEF 103. The message sent may be a Credit Control Answer (CCA) sent e.g. via the Gx interface.

As has been presented hereinabove, the PCRF 102 can, not only upon bearer-activation/update, but also in a plurality of intermediate situations (e.g., also upon subscriber profile modification or the PCRF receiving a service reporting), dynamically update the QCI/QoS profile, thus enabling the PCEF 103 to enforce the updated QCI/QoS profile on the cellular network traffic.

Figure 4:
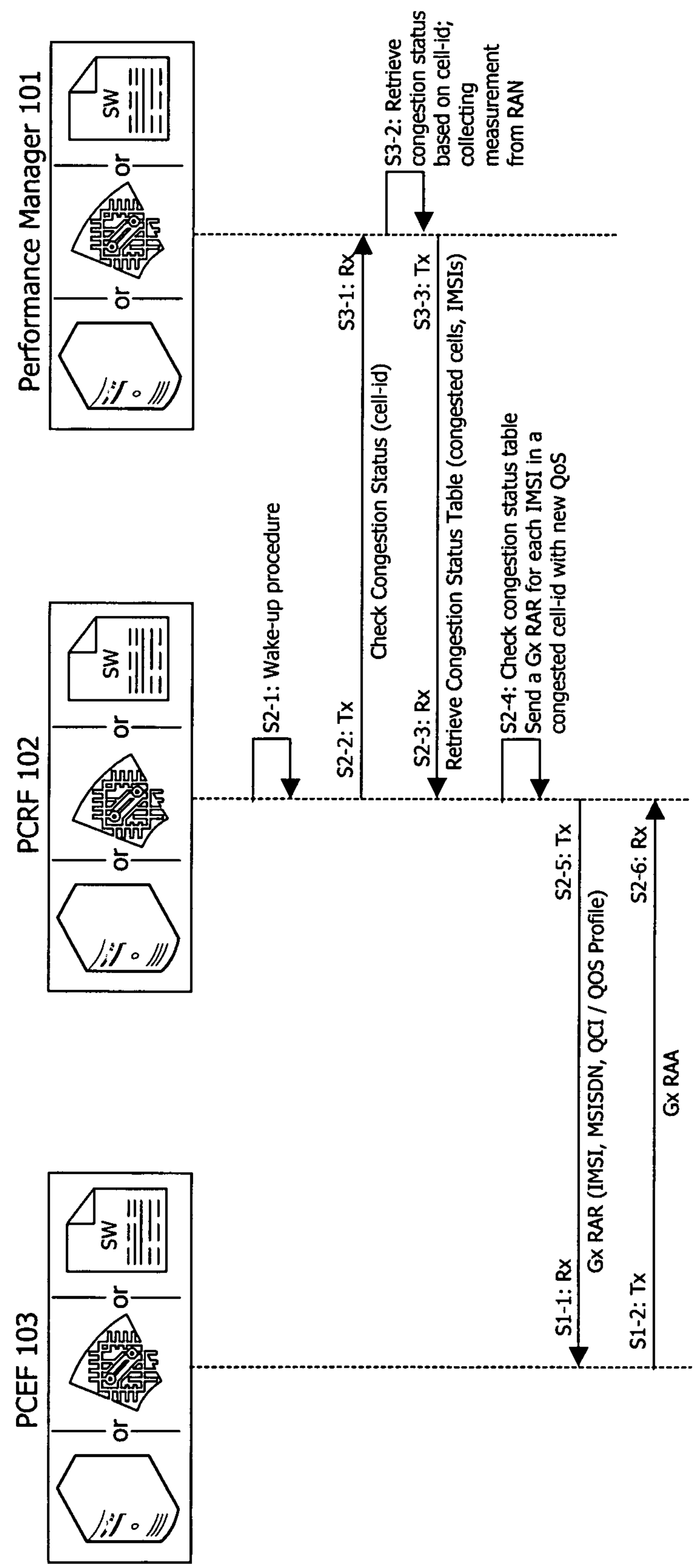
FIG. 4 shows a signaling diagram illustrating the introduction of a real-time congestion status in a policy decision in a cellular network according to a second embodiment of the present invention.

FIGS. 4 and 5 illustrate a method and apparatuses, respectively for introducing a real-time congestion status in a policy decision in a cellular network according to the second embodiment. It is to be noted that apart from steps S1-1 and S1-2 of the first embodiment missing in the PCEF 103, and new step S2-1 performed in the PCRF 103, the second embodiment is highly similar to the first embodiment. Thus, in the following description, only the differences to the first embodiment will be described. Consequently, all omissions made in the following description are to be filled with the corresponding description of the first embodiment.

In step S2-1, the core functionality/CPU 1021 of the PCRF 102 obtains the at least one cell identifier from the database/memory 1022 upon a wake-up procedure of the PCRF and/or a repeatedly performed look-up from the PCRF 102 at the Performance Manager 101. For example, the PCRF 102 may further comprise a timer (not shown) which triggers the PCRF 102 to resume operability for example upon elapse of the timer, thus enabling, a repeated (e.g., periodical) wake-up or a wake-up according to a set of different time spans.

Steps S2-2 and S3-1 are similar to the first embodiment, the only difference being that the IMSI in the request may be omitted.

In steps S3-2, S3-3 and S2-3, the collector 1015 of the Performance Manager 101 collects/retrieves a congestion status table which is then sent to the PCRF 102. This congestion status table comprises at least one congested cell, at least one congestion status of the at least one congested cell, and at least one IMSI related to the at least one congested cell.

In step S2-4, the generator 1025 generates the QCI and/or QoS profile based on checking the congestion status table. Further, the message sent in step S2-5 may be sent for each IMSI of the congested cell identified by the cell identifier. In addition, the message sent may be a Re-Authorization Request (RAR)—sent, for example, via the Gx interface—which may further comprise one of the IMSIs.

Finally, in an optional step S1-2, the transmitter 1033 sends a Re-Authorization Answer (RAA) for confirming earlier reception of the RAR for example via the Gx interface. In turn, in an optional step S2-6, the receiver 1024 of the PCRF 1024 receives the RAA sent.

As has been shown hereinabove, the PCRF 102 triggers the PCRF 102 to resume operability (e.g., upon elapse of the timer), thus enabling, for example, a periodical wake-up or a wake-up according to a set of different time spans to repeatedly update the QCI/QoS profile. Thus the PCEF 103 is enabled to enforce the thus dynamically adapted QCI/QoS profile on the cellular network traffic.

Figure 6:
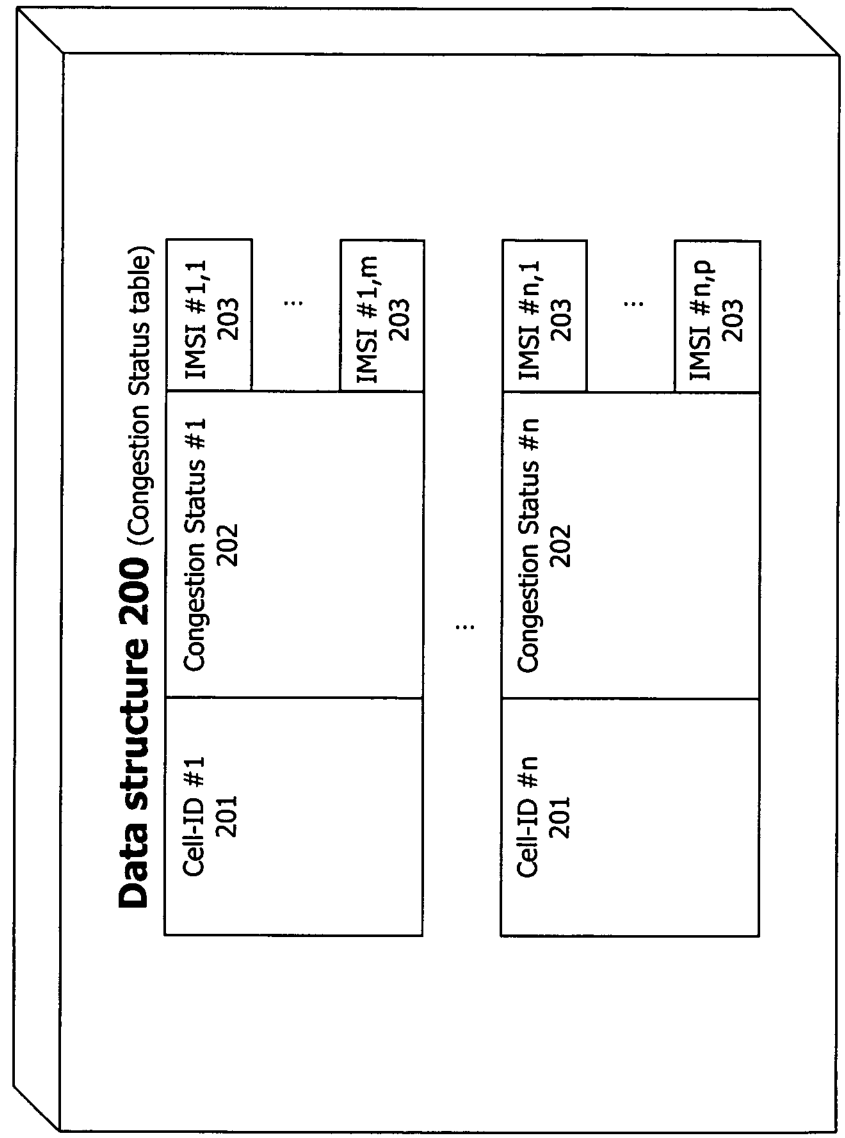
FIG. 6 shows a data structure for introducing a real-time congestion status in a policy decision in a cellular network according to the second embodiment of the present invention.

Finally, in relation to the second embodiment, FIG. 6 shows a data structure 200 for introducing the real-time congestion status in the policy decision. The data structure 200 may take the form of the above-described Congestion Status table and may be stored.

As shown in FIG. 6, the data structure 200 comprises a field 201 storing a cell-ID #1, a field 202 storing the congestion status #1 of the Cell-ID #1, and a field 203 storing up to m IMSIs pertaining to the cell identified by Cell-ID #1, m being an integer equal to or greater than 2. Accordingly, the data structure 200 may store up to n−1 further cell-IDs in the above-described way. Exemplary, Cell-ID #n is shown having its respective congestion status #n. In turn, there may up to p IMSIs pertaining the cell identified by Cell-ID #n, p being an integer equal to or greater than 2.

Pertaining to the above embodiments, one or more of the above-described components for obtaining 1024, for sending 1013, 1023, for receiving 1014, 1024, for generating 1025 and for retrieving/collecting 1015 as well as the entire Performance Manager 101, PCRF 102 and/or PCEF 103, or the respective functionalities carried out, may be implemented as a server, chipset, module or subassembly. Finally, the embodiments of present invention also relate to a system which may at least comprise the Performance Manager 101 and the PCRF 102 according to the above-described embodiments of the present invention. Optionally, the system may further comprise the PCEF 103 and at least one terminal.

As has become apparent from the above embodiments, the technique presented herein brings about one or more of the following advantages. First, a real-time congestion analysis can be introduced. As a consequence the current congestion status can be used for changing, for example, the Maximum Bit Rate (MBR) of just the subscribers in congested cells. Moreover, applying specific policies depending on the actual subscriber position becomes possible, i.e., the Performance Manager has the updated cell identifier for the subscriber and session. In current deployments, the PCRF only receives the actual cell identifier at bearer establishment/update. If the subscriber makes a cell handover and there is no bearer update (typical case), the updated cell identifier is not sent (e.g., via the Gx interface). Future congestion situations can be prevented, i.e., a historical cell congestion analysis can be used for assigning policies. For instance, a usually congested cell may receive less MBR than a normal cell. Also, legacy techniques are supported, i.e., no impacts on existing terminals and/or RANs occur.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous. Because the technique presented herein can be varied in many ways, it will be recognized that the invention should be limited only by the scope of the claims that follow.

The invention claimed is:

1. A method for introducing a real-time congestion status in a Policy and Charging Rules Function (PCRF) policy decision in a cellular network, the method performed in the PCRF and comprising:
 - obtaining at least one cell identifier from a Policy Charging Enforcement Function (PCEF);
 - sending a request for checking congestion status to a Performance Manager network element, the request comprising the at least one cell identifier;
 - receiving a retrieved congestion status for the at least one cell identifier from the Performance Manager network element;
 - generating at least one of a Quality of Service (QoS) Class identifier (QCI) and a QoS profile based on the at least one cell identifier and the received congestion status;
 - sending a message to the PCEF, the message comprising the at least one of the QCI and the QoS profile;
 - wherein the obtaining the at least one cell identifier comprises obtaining the least one cell identifier from the PCEF upon at least one of:
   - network bearer establishment;
   - network bearer update;
   - subscriber profile modification; and
   - the PCRF receiving a service report.

2. The method of claim 1, wherein the at least one cell identifier is obtained via a Credit Control Request.

3. The method of claim 1, wherein the request for checking congestion further comprises an International Mobile Subscriber Identity.

4. The method of claim 1, wherein the generating comprises generating the at least one of QCI and the QoS profile based on a QoS policy decision.

5. The method of claim 1, wherein the message comprising the at least one of the QCI and the QoS profile is a Credit Control Answer.

6. The method of claim 1, wherein the retrieved congestion status comprises a congestion status table, the congestion status table comprising:
 - information indicative of at least one congested cell;
 - at least one congestion status of the at least one congested cell; and
 - at least one International Mobile Subscriber Identity (IMSI) identifier related to the at least one congested cell.

7. The method of claim 6:
 - wherein the generating comprises generating the at least one of the QCI and the QoS profile based on checking the congestion status table; and
 - wherein the sending a message to the PCEF comprises sending at least one of the QCI and the QoS profile for each IMSI of the congested cell identified by the cell identifier.

8. The method of claim 7, wherein the message comprising the at least one of the QCI and the QoS profile is a Re-Authorization Request and comprises one of the IMSIs.

9. A computer program product stored in a non-transitory computer readable medium for introducing a real-time congestion status in a Policy and Charging Rules Function (PCRF) policy decision in a cellular network, the computer program product comprising software instructions which, when run on a computing device, causes the computing device to:
 - obtain at least one cell identifier from a Policy Charging Enforcement Function (PCEF);
 - send a request for checking congestion status to a Performance Manager network element, the request comprising the at least one cell identifier;
 - receive a retrieved congestion status for the at least one cell identifier from the Performance Manager network element;
 - generate at least one of a Quality of Service (QoS) Class identifier (QCI) and a QoS profile based on the at least one cell identifier and the received congestion status;
 - send a message to the PCEF, the message comprising the at least one of the QCI and the QoS profile;
 - wherein the at least one cell identifier is obtained from the PCEF upon at least one of:
   - network bearer establishment;
   - network bearer update;
   - subscriber profile modification; and
   - the PCRF receiving a service report.

10. A network element implementing a Policy and Charging Rules Function, (PCRF) for introducing a real-time congestion status in a PCRF policy decision in a cellular network, the network element comprising:
 - a receiver configured to obtain at least one cell identifier from a Policy Charging Enforcement Function (PCEF);
 - a transmitter configured to send a request for checking congestion status to a Performance Manager network element, the request comprising the at least one cell identifier;
 - the receiver configured to receive a retrieved congestion status for the at least one cell identifier from the Performance Manager network element;
 - a processing circuit configured to generate at least one of a Quality of Service (QoS) Class identifier (QCI) and a QoS profile based on the at least one cell identifier and the received congestion status; and
 - the transmitter configured to send a message to the PCEF, the message comprising the at least one of the QCI and the QoS profile;
 - wherein the at least one cell identifier is obtained from the PCEF upon at least one of:
   - network bearer establishment;
   - network bearer update;
   - subscriber profile modification; and
   - the PCRF receiving a service report.

* * * * *